United States Patent [19]

Benard

[11] Patent Number: 5,133,147
[45] Date of Patent: Jul. 28, 1992

[54] FLEXIBLE ROTARY WING FOR ARTIFICIAL FISHING LURE

[76] Inventor: Claude Benard, Les Salles, 29111 Scaer, France

[21] Appl. No.: 700,961

[22] Filed: May 16, 1991

[51] Int. Cl.⁵ .............................................. A01K 85/00
[52] U.S. Cl. .................................. 43/42.21; 43/42.13; 43/42.19
[58] Field of Search .................. 43/42.2, 42.12, 42.13, 43/42.14, 42.15, 42.16, 42.17, 42.19, 42.21, 42.31

[56] References Cited

U.S. PATENT DOCUMENTS

| 281,083 | 7/1883 | Kessler | 43/42.19 |
| 771,116 | 9/1904 | Barnhart | 43/42.14 |
| 1,339,189 | 5/1920 | Frensdorf | 43/42.19 |
| 1,558,249 | 10/1925 | DeZeng | 43/42.14 |
| 1,920,676 | 8/1933 | Burckhardt | 43/42.16 |
| 3,020,668 | 2/1962 | O'Neil | 43/42.16 |
| 4,163,338 | 8/1979 | Lucarini | 43/42.17 |

Primary Examiner—Richard K. Seidel
Assistant Examiner—Chuck Y. Mah
Attorney, Agent, or Firm—Armstrong, Nikaido, Marmelstein, Kubovcik & Murray

[57] ABSTRACT

An artificial lure 1 for fishing both in fresh water and in sea water including a first part composed of a volume-of-revolution 2 crossed by a duct 3 along an axis of revolution of the volume and a spiral second part 4, the whole being made of a flexible material.

1 Claim, 1 Drawing Sheet

1

FLEXIBLE ROTARY WING FOR ARTIFICIAL FISHING LURE

BACKGROUND OF THE INVENTION

The present invention concerns an artificial fishing lure both for fresh water and sea water. This lure may be used alone or in combination with other lures well known to the expert.

Illustratively an artificial lure already is known which comprises a rotary spoon mounted on the end of a metal rod to which is attached a fishing line filament, a hook being mounted on the other end of this rod. U.S. Pat. No. 4,163,338, in particular, describes such a lure: the metal spoon is curved; at rest this spoon assumes a substantially vertical position.

While such lures are effective, they nevertheless incur a substantial drawback that the fisherman himself is not necessarily aware of. In spite of the attractiveness of the lure, the fish may be dissuaded from biting because of the spoon's rigidity. There are many reasons for such dissuasion; mostly they are:

depending on the angle a fish engages a lure, it may close its mouth on the lure plate in the case of a spoon without being caught and at once reject the whole thing, the spoon plate may stick to its arbor or start rotating too slowly, degrading the lure's attractiveness.

OBJECTS AND SUMMARY OF THE INVENTION

One of the objects of the present invention is to create an artificial lure for fishing both in fresh water and in sea water and palliating the above drawbacks.

Another object of the invention is to create a lure allowing simple and economical manufacture.

These and other objects discussed below are met by an artificial lure for both fresh and sea water fishing which is characterized in that it comprises a first part composed of a volume of revolution through which passes a duct along its axis of revolution, and a spiral second part made of a flexible material and joined to the first part along a line substantially parallel to the axis of revolution.

Advantageously this lure shall be a preferably flexible plastic selected in particular from the following materials: plastisol, flexible PVC, natural or synthetic rubber, silicone or any other flexible material of this sort.

Advantageously the second spiral part assumes the shape of a wing.

As mentioned above, this lure may be used in combination with other lures such as a fly, or a fish, the concavity of the second, spiral part being in the direction opposite to that where the hook is located.

As regards some kinds of fishing, two such lures may be advantageously mounted on one line, where called for in combination with other lures.

BRIEF DESCRIPTION OF THE DRAWINGS

The description below implies no restriction whatever and must be construed together with the attached Figures.

DETAILED DESCRIPTION OF PREFERRED EMBODIMENTS

Figure 1:
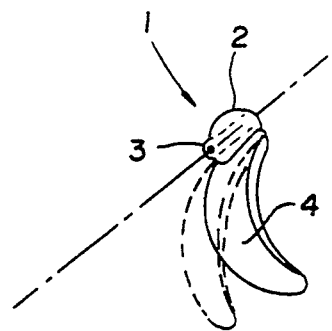
FIG. 1 is an artificial lure of the present invention.

As shown by FIG. 1, an artificial lure of the present invention denoted on the whole by 1 comprises two parts, a first substantially ovoid part 2 as regards this embodiment and crossed by a duct 3 along an axis of revolution, and a spiral second part 4 made of a flexible material.

This second spiral part 4, which is right-handed or left-handed, is a wing attached to the first part 2 along a line substantially parallel to the axis of revolution.

In fact the lure 1 is integral, for instance by means of molding. The flexible material of this lure is selected from the following plastics: plastisol, flexible PVC, natural or synthetic rubber, silicone or any other flexible material of this kind.

Because of the flexibility of its constitutive material, this wing 4 shall deform in the manner shown in dashed lines in FIG. 1 on account of the water pressure reducing its speed of rotation relative to a metal spoon. If for instance due to fishing it is necessary to accelerate the lure, it shall rotate very quickly and will scare the fish, but with a lure of the present invention, the wing rotation shall increase, but to a smaller degree, as explained below.

By virtue of the shape of its wing, when the lure is pulled, water comes to press against the wing which is turned to the exterior, that is in the direction opposite of the filament on which the lure is mounted, as shown in the drawings, thus causing an immediate activation at the slightest tug.

Figure 2:
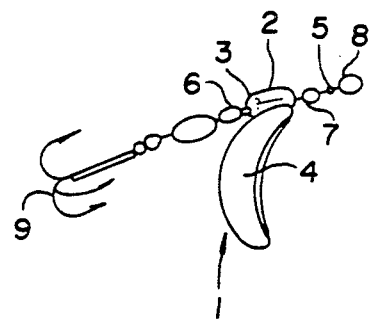
FIG. 2 shows this lure mounted on a fishing line.
Figure 3:
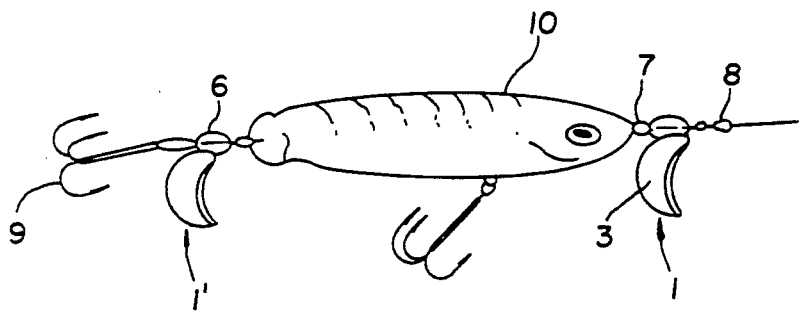
FIGS. 3 and 4 shows this lure mounted in combination with other lures on one fishing line.
Figure 4:
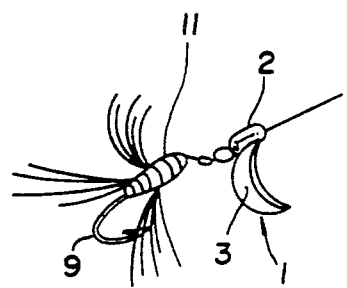

As already mentioned and as shown by FIGS. 2 through 4, the artificial lure of the present invention may be mounted alone or else with other lures on one fishing line.

In describing FIGS. 2 through 4, homologous or analogous elements will be referred to by the same numeral, for purpose of simplication.

FIG. 2 shows an embodiment wherein an artificial lure 1 of the invention is mounted alone on a fishing line. In this case it serves as a metal spoon. It is mounted on a metal rod 5 between two beads 6 and 7, with the rod comprising at one end a ring 8 to affix a fishing line and at its other end an illustratively triple hook 9. The wing concavity points to the ring 8, that is opposite the direction toward the hook 9.

FIG. 3 shows an assembly wherein the artificial lure 1 of the present invention is mounted in combination with a helix fish 10. In this instance this fish is framed by two wings 1 and 1' of mutually opposite directions.

No size restriction attaching to the artificial lure of the present invention, it may be miniaturized and be put on the fly line as shown by FIG. 4. In this embodiment, the artificial lure 1 is located in front of a fly 11 which thereby is present between the hook 9 and this lure 1.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determinig the full scope of the invention.

What I claim is:

1. An artificial lure for fishing to be mounted above a hook, comprising a first part comprising a volume of revolution through which passes a duct along an axis of revolution of said volume of revolution, and a spiral second part made of a flexible material, said second part being in the shape of a wing and being joined to the first part along a line substantially parallel to said axis of revolution, said wing having a concave side which is directed in the direction opposite of the direction of the position of said hook.

* * * * *